United States Patent [19]

Foster

[11] Patent Number: 4,732,056

[45] Date of Patent: Mar. 22, 1988

[54] SAW CHAIN GRINDING MACHINE

[76] Inventor: Thomas S. Foster, 1016 Coolidge Rd., Aberdeen, Wash. 98520

[21] Appl. No.: 914,764

[22] Filed: Oct. 2, 1986

[51] Int. Cl.⁴ .............................................. B23D 63/16
[52] U.S. Cl. ....................................... 76/25 A; 76/40; 51/5 D
[58] Field of Search ...................... 76/25 A, 37, 40, 43, 76/74, 78 R, 78 A; 51/5 D

[56] References Cited

U.S. PATENT DOCUMENTS

| | | | |
|---|---|---|---|
| 2,641,873 | 6/1953 | Haas | 51/5 D |
| 3,349,645 | 10/1967 | Silvey | 76/40 |
| 3,592,085 | 7/1971 | Arneson | 76/25 A |
| 3,695,123 | 10/1972 | Silvey | 76/43 |
| 3,717,051 | 2/1973 | Silvey | 76/37 |
| 3,779,103 | 12/1973 | Silvey | 76/25 A |
| 3,877,324 | 4/1975 | Silvey | 76/25 A |
| 3,880,018 | 4/1975 | Simington | 76/25 A |
| 4,287,793 | 9/1981 | Silvey | 76/25 A |
| 4,299,142 | 11/1981 | Kaye | 76/25 A |
| 4,336,726 | 6/1982 | Silvey | 76/25 A |
| 4,398,437 | 8/1983 | Silvey | 76/25 A |
| 4,416,169 | 11/1983 | Silvey | 76/25 A |

FOREIGN PATENT DOCUMENTS 36556 10/1971 Japan .................................. 51/5 D Primary Examiner—Roscoe V. Parker
Attorney, Agent, or Firm—Bruce A. Kaser

[57] ABSTRACT

A saw chain grinding machine (10) is provided for sharpening a cutter link (56) of a saw chain (24). A grinding wheel (20) is swingable into position for grinding. A chain carriage (48) then brings the cutter link (56) into engagement with the grinding wheel (20). The chain carriage (48) has a base portion (12) mounted to the machine with the base portion having a pair of upwardly extending vertical supports (72, 74). A guide bar (76) spans the distance between them. The carriage housing (49) is mounted to the guide bar (76) by a plurality of rollers (78, 80, 82, 84, 86, 88, 90, 92, 94) which permit the housing to freely roll along the bar. Movement of the housing (49) is controlled by a control cable (98) that is operable to move the housing and thus the cutter link against the grinding wheel (20).

9 Claims, 17 Drawing Figures

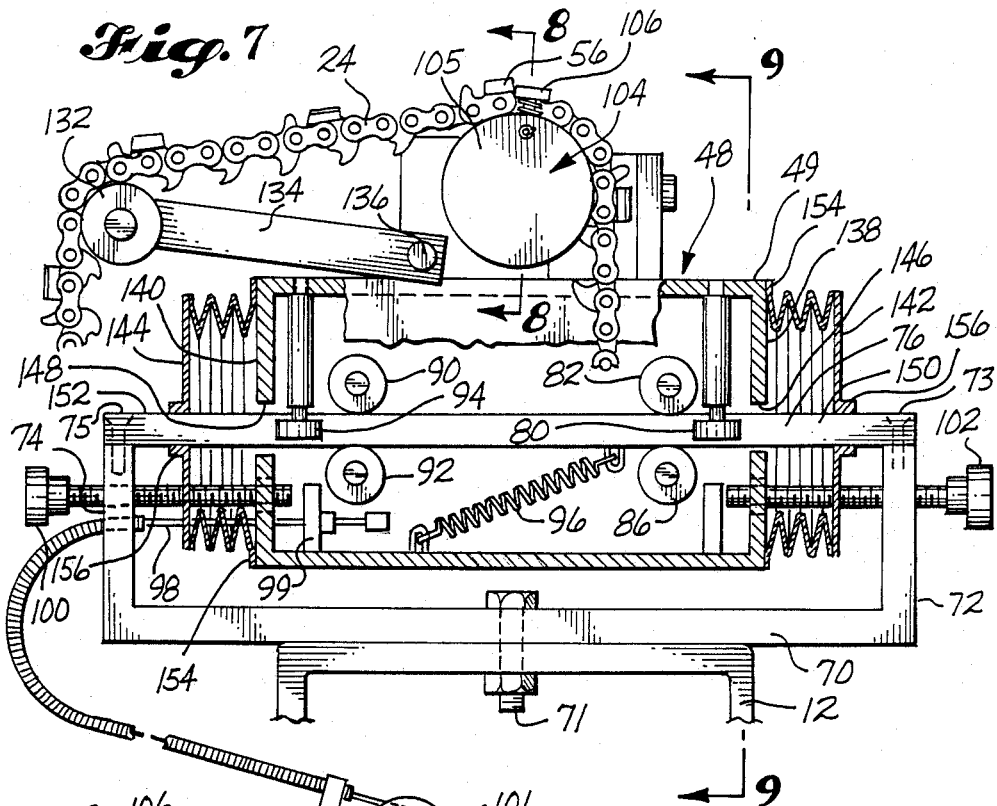
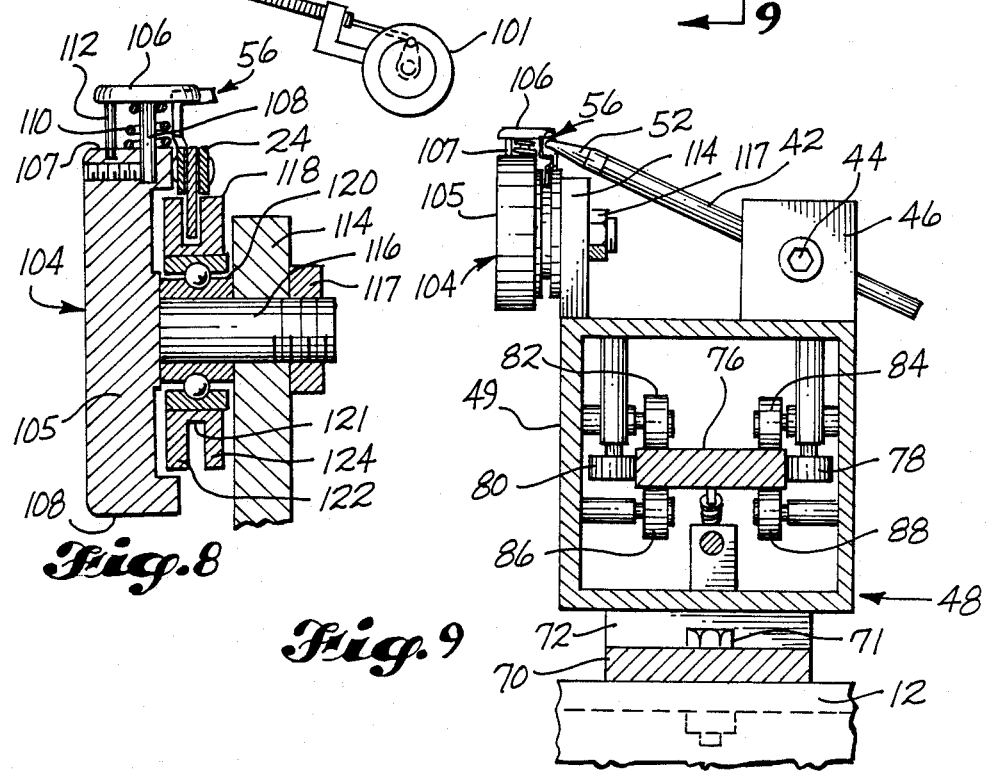

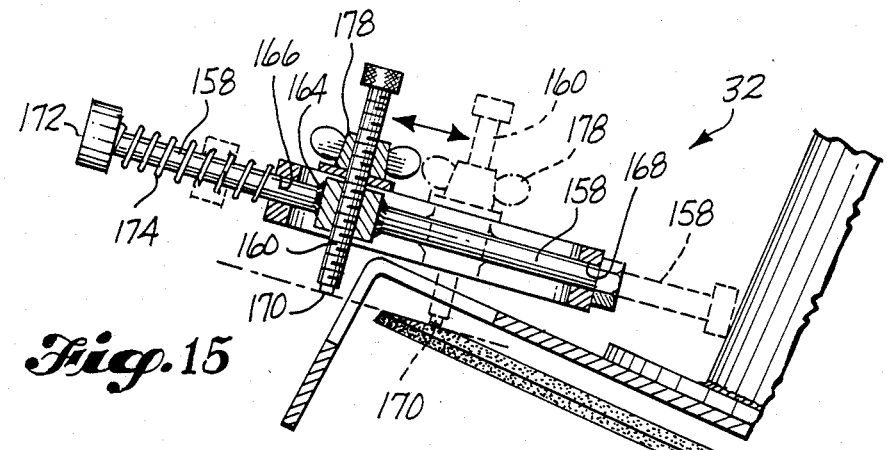
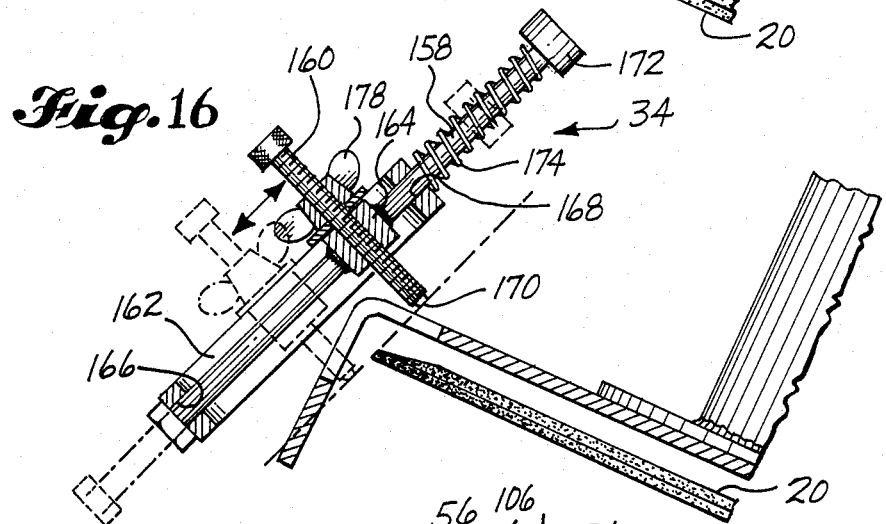
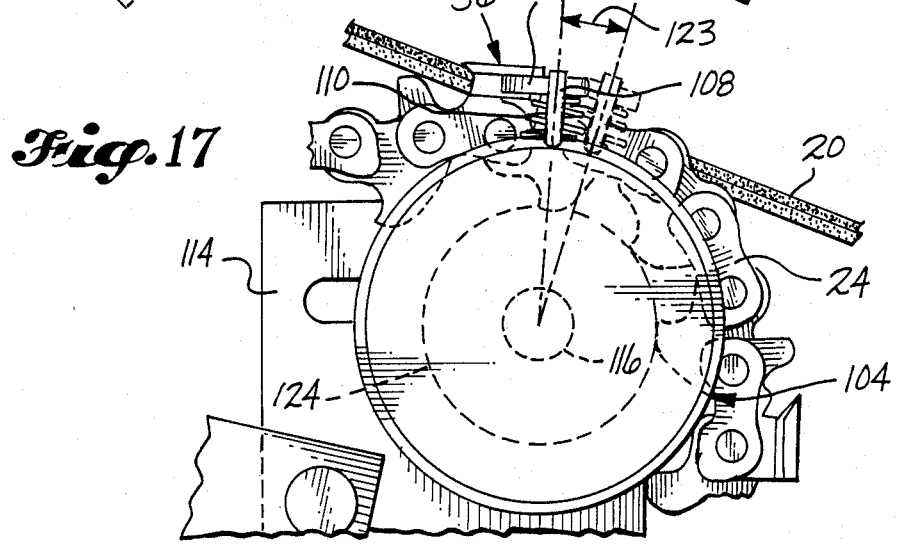

SAW CHAIN GRINDING MACHINE

DESCRIPTION

1. Technical Field

This invention relates to devices in which emery wheels are used to sharpen objects. More particularly, this invention relates to devices wherein disc-shaped grinding wheels are used to sharpen timber industry saw chains.

2. Background Art

Chain saws are, of course, well known in the art. As with any cutting instrument the various cutter links making up a saw chain grow dull after a period of use. Rather than discard a dull chain and replace it with a new one, it is more economical to resharpen the chain. Unfortunately, resharpening the large number of cutter links making up a typical chain poses a lengthy and time-consuming task. In order to facilitate such sharpening, a large number of grinding devices have been developed, one of the more pertinent of which to the present invention is a saw chain grinding machine disclosed In U.S. Pat. No. 3,349,645, issued to E. R. Silvey on Oct. 31, 1967.

The term of Silvey's patent has expired. As will be apparent, the present invention is a device very similar in construction and operation to Silvey's saw chain grinding machine. However, the present invention provides certain improvements over Silvey's machine which result in a grinding machine that operates more effectively than Silvey's, or any other like machine known in the art. These improvements, and the advantages associated therewith, will become apparent to the reader upon reading the rest of this patent application.

3. Disclosure of the Invention

The present invention provides an improved form of saw chain grinding machine, wherein a cutter link of a saw chain is brought into engagement with a rotating grinding wheel that sharpens the link.

In preferred operation, the grinding wheel is pivotally mounted to the machine so that it can be swung to and from a grinding position. When the wheel is in the grinding position, a cutter link, held by a carriage device, is moved into engagement with the wheel thus sharpening the link.

In the present invention, the carriage device which moves the link has a base, mounted to the machine, and includes a pair of spaced upwardly extending vertical supports. A guide bar is supported at each end by the supports and spans the distance between them. A carriage housing, which holds the chain, is movable along the guide bar for bringing individual cutter links of the chain into engagement with the grinding wheel. A set of rollers guide the carriage housing along the guide bar thus reducing friction and making it easy to move the carriage housing along the bar. The rollers permit the housing to be moved with a minimum amount of force.

A tension spring interconnects the housing and the guide bar, and is biased in a direction tending to pull the particular cutter link being sharpened away from the grinding wheel. A control cable is connected to the housing and is operable for pulling the housing against the bias of the spring, to engage the link with the wheel.

An advantage to the present invention is that since the carriage housing moves easily along the guide bar this provides an operator of the invention with a highly sensitive "feel" of how much force is exerted against the cutter link by the grinding wheel during sharpening.

The many cutter links making up a saw chain can only be sharpened a certain amount before they are worn to the point they can be sharpened no further. Heavy-handed sharpening of a cutter link therefore reduces the number of times the link can be sharpened thus reducing the useful life of a chain. Enhancing the "feel" during sharpening means that a chain can be sharpened more times, extending chain life, and ultimately reducing the cost of purchasing new chains.

In association with the above advantage, another advantage to the present invention is that the rollers guiding the carriage housing along the guide bar provide accurate positioning for each cutter link relative to the grinding wheel. This ensures uniform sharpening of all cutter links when a plurality of links are sequentially sharpened.

Further, an improved form of chain holder is mounted to the top of the carriage housing and provides a new and useful mode for leveling or adjusting the angular position of the chain's cutter links. In the present invention, cutter link position may be angularly adjusted about a horizontal axis, such axis being generally perpendicular to the side of the chain. This adjustment is used to level the link prior to grinding and provides good grinding accuracy.

The chain holder also includes a chain stop member with a link-catching portion that holds the link in a desired grinding position. This link-catching portion is pivotable about an axis so that the chain can be moved along the chain holder to permit sequential sharpening of a plurality of links.

The present invention also includes stone dressers, mounted to the machine, for dressing the edge of the grinding wheel. Each stone dresser has an elongated dressing member with a stone dressing end. This dressing member is held by a guide mounted to the machine and in which the member is slidably movable. When the member is moved, the guide causes the member's stone dressing end to dress the edge of the wheel. The wheel will typically have a beveled edge having two edge surfaces, wherein one edge surface engages with a top plate cutting edge of each cutter link, and the other edge surface simultaneously engages with the cutter link's side plate cutting edge. For this particular configuration, a separate stone dresser would be provided for each edge surface. The stone dressers provide accurate dressing of the grinding wheel so that the angle of its beveled edge remains uniform during sharpening, meaning the useful life of the wheel will be prolonged.

BRIEF DESCRIPTION OF THE DRAWINGS

Referring now to the drawings and wherein like reference numerals and letters refer to like parts throughout the various views:

FIG. 7 is a side cross-sectional view of a carriage device constructed in accordance with a preferred embodiment of the invention, and shows how the carriage device is operable to move the cutter link shown in FIGS. 5 and 6 into engagement with the grinding wheel;

FIG. 8 is a cross-sectional view of the chain holder shown in FIGS. 5-7, and is taken along line 8—8 in FIG. 7;

FIG. 9 is an end cross-sectional view of the carriage device shown in FIG. 7, and is taken along line 9—9 in FIG. 7;

FIG. 15 is a side cross-sectional view of one of the stone dressers shown in FIG. 14 and is taken along line 15—15 in FIG. 14;

FIG. 16 is a side cross-sectional view of the other stone dresser shown in FIG. 14 and is taken along line 16—16 in FIG. 14; and FIG. 17 is a view like FIG. 11, but shows how the circular chain holder of FIGS. 5-7 may be angularly adjusted to level the position of a saw chain cutter link for accurate sharpening.

BEST MODE FOR CARRYING OUT THE INVENTION

Figure 1:
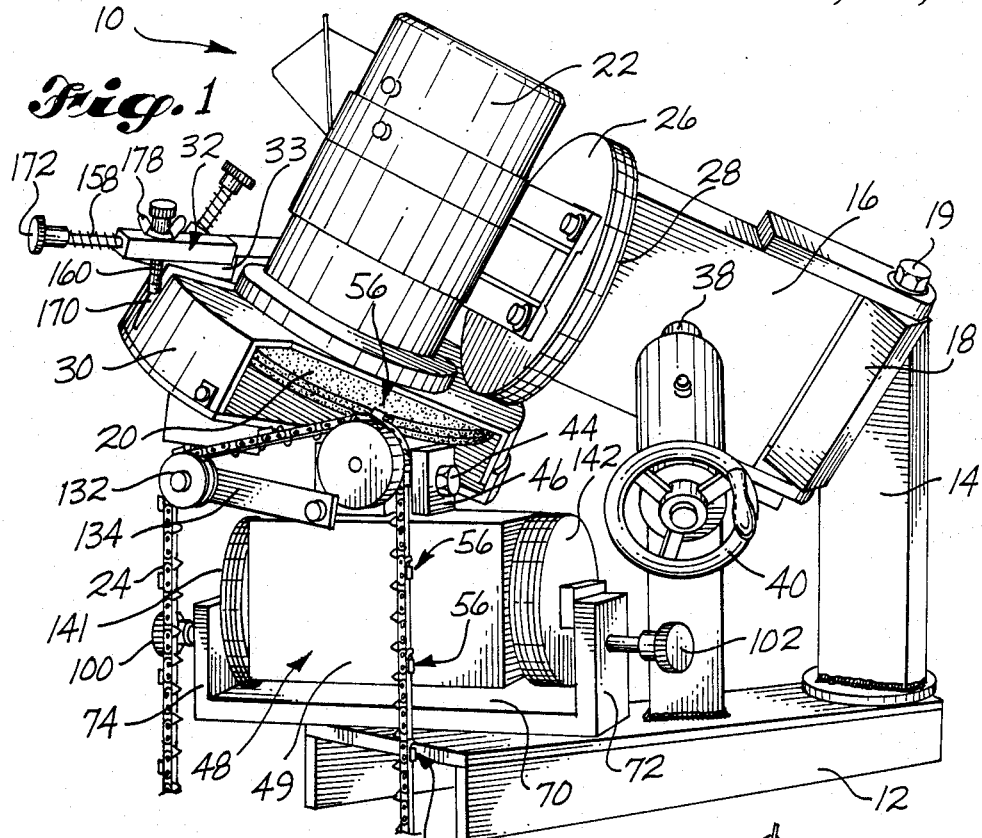
FIG. 1 is a pictorial view of a saw chain grinding machine constructed in accordance with a preferred embodiment of the invention.
Figure 4:
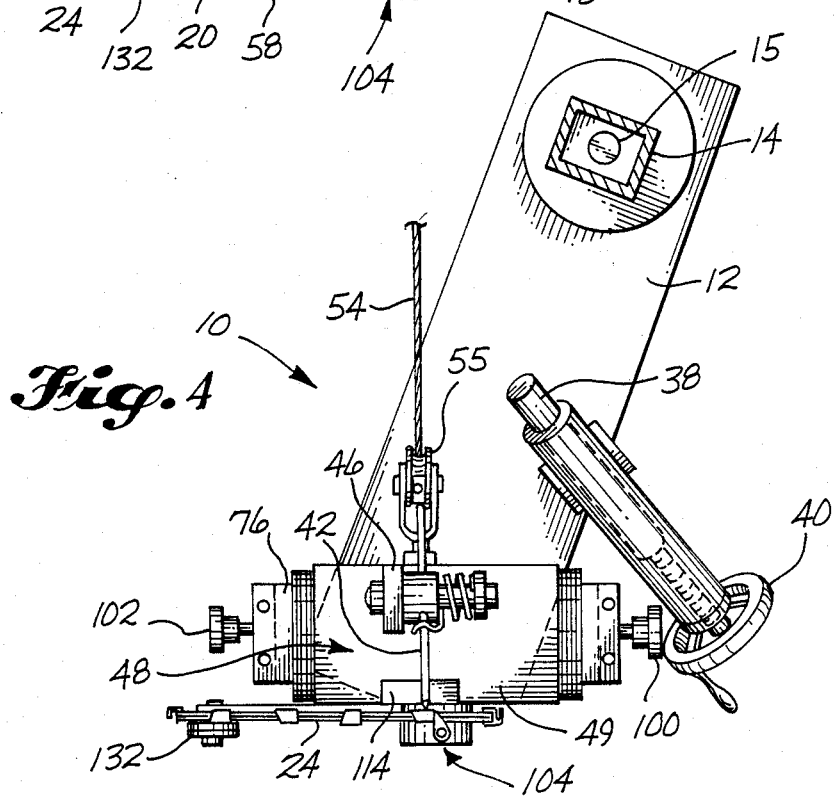
FIG. 4 is a top view of the machine shown in FIG. 3 but with the grinding wheel and swing arm which moves the wheel being removed from the machine.
Figure 10:
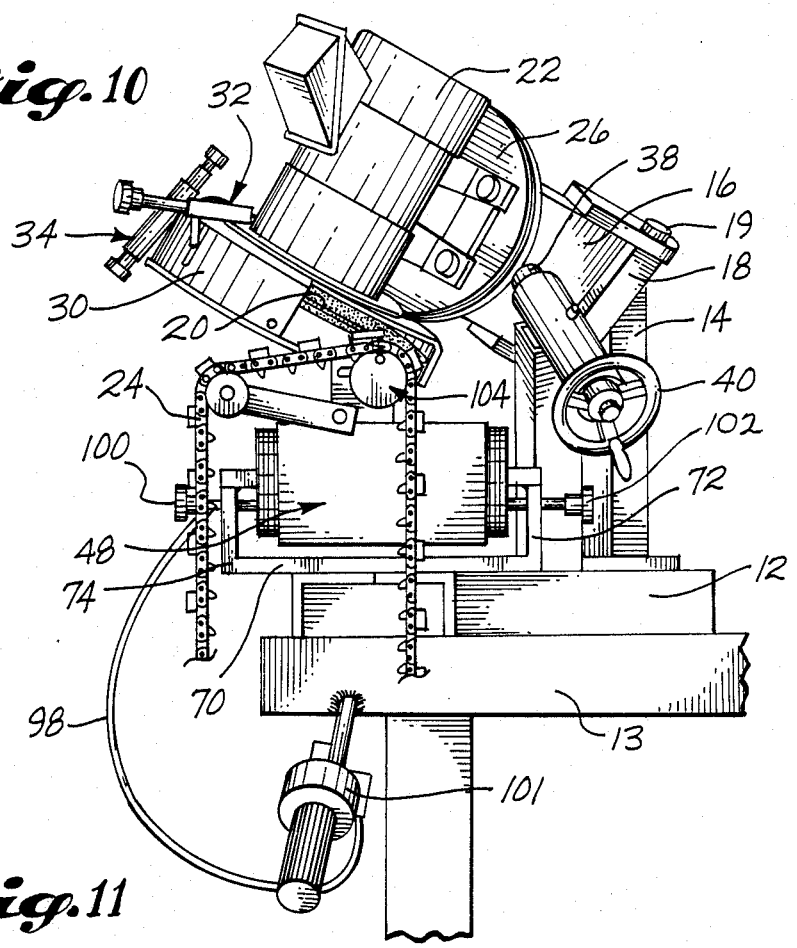
FIG. 10 is another pictorial view of the machine shown in FIGS. 1-2, and shows the machine supported by a platform, and a control cable for moving the carriage device shown in FIG. 7.
Figure 11:
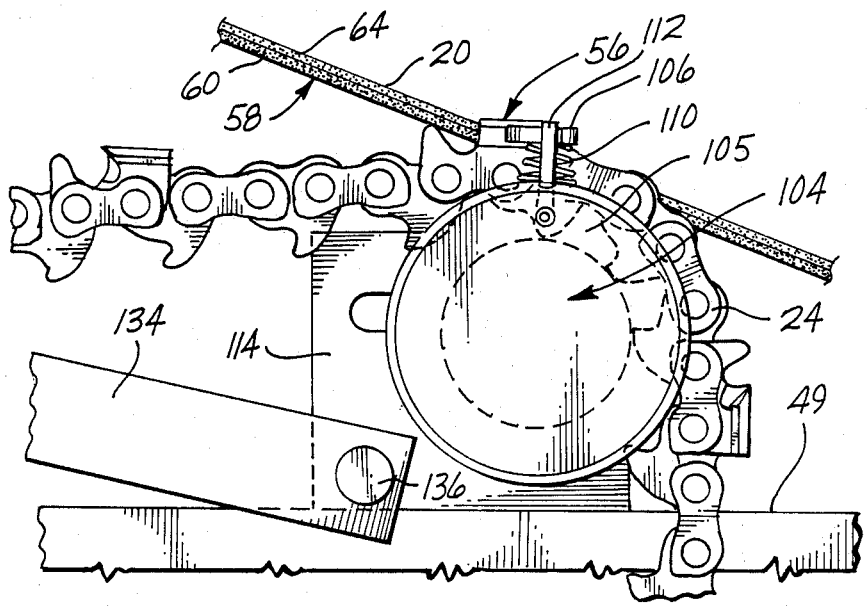
FIG. 11 is an enlarged fragmentary side view of the chain holder shown in FIGS. 5-7.

Referring now to the drawings, and first to FIG. 1, therein is shown a saw chain grinding machine 10 constructed in accordance with a preferred embodiment of the invention. The machine 10 has a base 12 which may rest on a table or other support 13 (see FIG. 10). Mounted to the base 12 is a vertical column 14 that is connected to the base by a nut and bolt connection, or similar means, which extends through the base as indicated at 15 in FIG. 4. Loosening this connection 15 permits the column 14 to pivot about a vertical axis for adjustment.

A swing arm 16 is connected to the column 14 by a pivot bracket 18. The swing arm 16 permits a grinding wheel 20, driven by an electric motor 22, to swing toward and away from a saw chain 24. The arm 16 pivots about an axis defined by a bolt 19 in the bracket 18. Another bolt 21 provides pivotal adjustment of the bracket 18 relative to the vertical column 14.

The motor 22, which may be a variable speed type motor, is connected to the swing arm 16 by means of a pair of discs 26, 28. These discs 26, 28 may be constructed in a manner such that they pivot relative to each other, to permit further pivotal adjustment of the position of the motor 22 and wheel 20 about an axis defined by the swing arm 16. A housing 30 covers most of the grinding wheel 20. A pair of stone dressers 32, 34, are mounted by brackets 33, 35, respectively, to the housing 30 and will be further described later.

Figure 2:
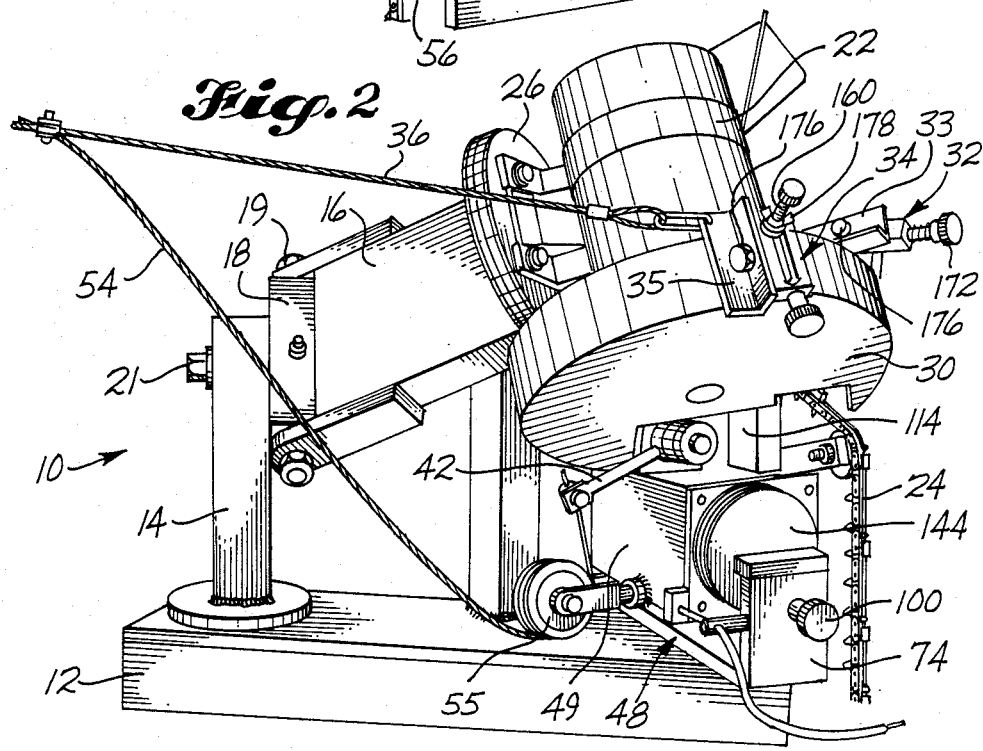
FIG. 2 is another pictorial view of the same machine shown in FIG. 1, but looking at another side of the machine.
Figure 3:
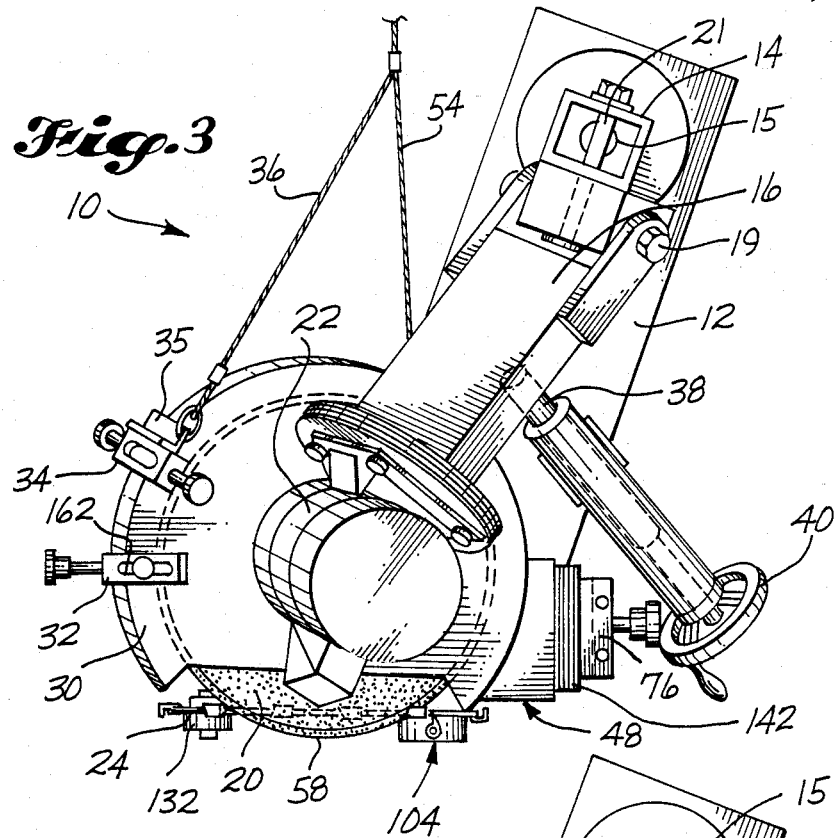
FIG. 3 is a top view of the machine shown in FIGS. 1 and 2.

Referring now to FIG. 2, swinging movement of the grinding wheel 20 is controlled by a cable 36 suitably attached to the wheel housing 30. The cable 36 may be pulled by either foot or hand controls (not shown in the drawings). When the grinding wheel 20 is swung into position for grinding, such movement is limited by an abutment 38 (see FIGS. 3 and 4). The position of the abutment 38 is adjustable by turning a wheel 40 that threadedly drives the abutment 38.

As the grinding wheel 20 swings into grinding position, a chain hold down member 42 (see FIG. 5) swings down to hold the chain 24 and prevent it from moving. This hold down member 42 is pivotally connected as shown at 44 to a bracket 46. The bracket 46 is connected to a chain carriage device 48, which will be described later. A spring 50 biases the hold down member 42 such that its end 52 tends to normally hold the chain 24 down as shown by the dashed lines 53 in FIG. 5. The hold down member's end 52 is raised by tension in a cable 54, which runs through a pulley 55 mounted to the rear of the carriage device 48. Control of the cable 54 coincides with control of the other cable 36 which, as was previously described, swings the grinding wheel 20 back and forth.

When the machine 10 is in operation, the grinding wheel 20 is first swung down (as shown at 55 in FIG. 5) and the carriage device 48 is then used to translate the chain 24 horizontally (as shown at 57 in FIG. 6) so that a cutter link 56 of the chain will move into engagement with the grinding wheel's edge 58. In preferred form, the grinding wheel's edge 58 is beveled and has two faces or edge surfaces 58, 60. One of the edge surfaces 60 is approximately parallel to the axis about which the wheel 20 turns. The other edge surface 64 is at a beveled angle relative to the first 60. These beveled edge surfaces 60, 64 simultaneously engage with the cutting edges on the side and top plates 66, 68, respectively, of the cutter link 56 to sharpen them.

Referring now to FIG. 7, the carriage device 48 has a base portion 70 mounted to the base 12 of the machine 10. A single bolt 71, as shown in FIG. 7, may be used to make this connection. Loosening this bolt 71 would permit pivotal adjustment of the carriage's position about a vertical axis.

The carriage base 70 has a pair of upwardly extending vertical supports 72, 74 which are spaced a distance from each other. A rectangular guide bar 76 is supported by the vertical supports 72, 74 and spans the distance between the supports. The guide bar 76 is connected to the vertical supports 72, 74 by screws 73, 75.

A carriage housing 49 is connected to the guide bar 76 by means of a plurality of rollers which will now be described by referring to FIG. 9 which shows the inside of the housing 49.

The housing 49 is supported on the guide bar 76 by a pair of rollers 78, 80 positioned for rolling contact with each vertical side of the guide bar, and four horizontal rollers 82, 84, 86, 88. Two of these latter rollers 86, 88 are positioned in rolling contact with the bottom horizontal surface of the guide bar 76. The other two rollers 82, 84 are positioned for rolling contact with the upper horizontal surface of the guide bar 76. All of the rollers 78, 80, 82, 84, 86, 88 shown in FIG. 9 constitute one of two like sets of rollers located inside the carriage housing 49. For example, referring again to FIG. 7, another set of rollers, the same in configuration as the set shown in FIG. 9, is located in the other end of the housing 49 and where two horizontal rollers 90, 92 and one vertical roller 94 of such set are shown. The various rollers 78, 80, 82, 84, 86, 88, 90, 92, 94 inside the carriage housing 49 cooperate with each other to permit the carriage housing 49 to move along the guide bar. Not only is a minimum amount of force required to move the carriage but the carriage moves without any slop or wobble.

Each end 138, 140 of the carriage housing 49 has an opening 146, 148 through which the opposite ends 150, 152 of the guide bar 76 project. These ends 138, 140 are each covered by flexible bellows 142, 144 fixedly connected to the housing ends 138, 140 as shown at 154, and to the guide bar 76 as shown at 156. The bellows 142, 144 expand or contract depending on the direction of movement of the housing 49 and seal the inside of the housing against dirt intrusion.

Interconnecting the carriage housing 49 and the guide bar 76 is a spring 96. The spring is biased to pull the carriage housing 49 away from the grinding wheel 20 which would move the cutter link 56 away from the wheel. A cable 98, connected to a bracket 99 mounted inside the housing 49 is operable to pull the carriage housing 49 against the bias of the spring. This cable 98 may be similar in construction to a motorcycle throttle cable that is operable by a handle bar grip 101. The total amount of horizontal movement of the carriage 49 along the guide bar 76 is limited by abutment screws 100, 102 which are threadedly engaged with the carriage base's vertical supports 74, 72.

Each cutter link 56 of the chain 24 is held atop the carriage housing 49 by a chain holder indicated at 104. The chain holder 104 is connected to a bracket 114 that is further mounted to the top of the carriage housing 49. Such connection is accomplished by a bolt 116 that is held in place by a nut 117 (see FIG. 8).

In preferred form, the chain holder 104 has a circular disc portion 105, and a radially extending chain stop member 106 being mounted to the outer radial edge surface 107 thereof. Loosening the nut 117 permits pivotal adjustment of the chain holder 104 about a horizontal axis, such axis being generally perpendicular to the side of the chain 24 and defined by the bolt 116. This provides angular adjustment of the position of the chain stop member 106 and the cutter link 56 held thereby for leveling the link as shown by arrows 123 in FIG. 17.

Also rotating about the same horizontal axis is a chain track 118 rotatably connected to the bolt 116 by a bearing 120. The chain track 118 has outer and inner guides or radial flanges 122, 124 which define a circular shaped track 121. The track 121 guides the chain during sharpening. An inwardly facing annular surface 130 of the chain holder guides the side of the chain 24 as it is pulled along the track 121.

The chain stop member 106 is used to accurately position for grinding each cutter link 56 of the chain 24. The chain stop member 106 is mounted to the circular disc's outer radial edge 107 by a radially extending pin 108. This pin 108 permits the chain stop member 106 to pivot about the axis defined by the pin as will be further described below. The chain stop member 106 has an inwardly projecting link-catching portion 109 which holds each link 56 as it engages with the grinding wheel 20.

Figure 13:
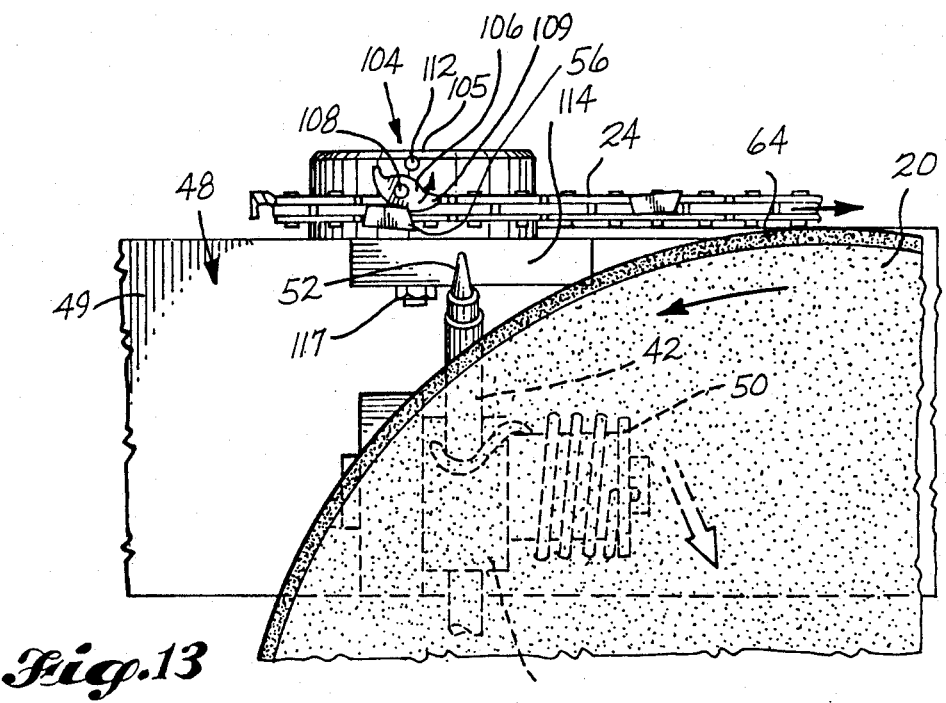
FIG. 13 is a view like FIG. 12 but shows the grinding wheel moving away from the cutter link, and further shows movement of a new cutter link into position for sharpening.

Referring now to FIG. 13, when another cutter link 56 is moved into sharpening position corresponding to movement of the chain 24 along the chain holder 104, the link-catching portion 109 pivots a sufficient amount to permit the next link to pass. A spring 110 is biased to oppose such movement and after the link 56 passes the member 106, the spring 110 pivots the link-catching portion 109 back to the position shown in FIGS. 5 and 6. Such pivotal movement is limited by another upwardly projecting pin 112. Then, the link 56 is moved against the chain stop member 106 and is held there as the carriage housing 49 moves.

Also mounted to the top of the carriage housing 49 is an idler pulley 132 which also guides the chain 24 during sharpening. This pulley 132 is mounted to the housing 49 by an arm 134 connected to the housing by a bolt 136.

As would be apparent to a person skilled in the art, a machine constructed in accordance with the above-described preferred embodiment of the invention provides a multitude of adjustments for accurately bringing the chain's cutter links 56 into precise engagement with the grinding wheel 20.

Figure 5:
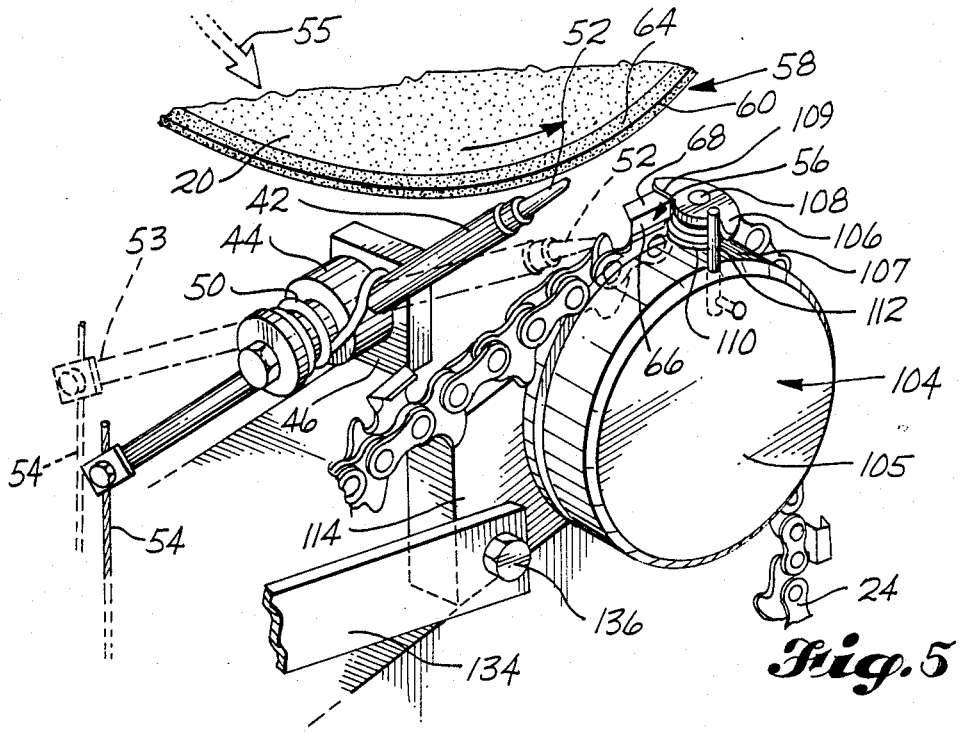
FIG. 5 is an enlarged pictorial view of a saw chain holder constructed in accordance with a preferred embodiment of the invention, and shows a chain hold down member and a grinding wheel both swinging down to respectively hold a chain and sharpen one of its cutter links.
Figure 6:
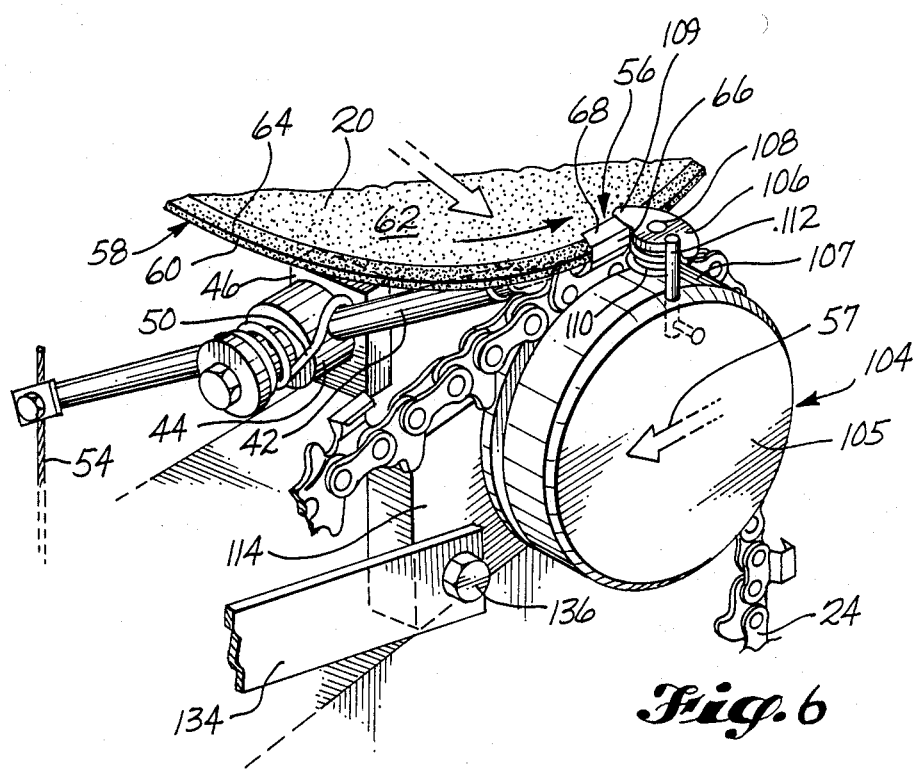
FIG. 6 is a view like FIG. 5 but shows the grinding wheel in engagement with the cutter link.
Figure 12:
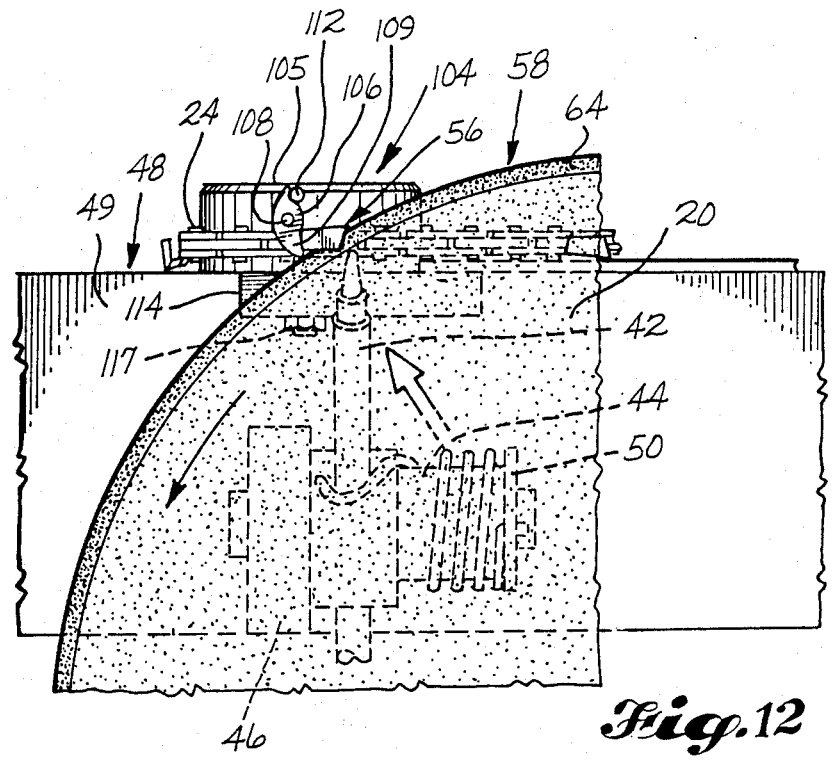
FIG. 12 is a top view of the chain holder and grinding wheel shown in FIG. 6.

To briefly summarize machine operation, a cutter link 56 is first placed against the link-catching portion 109 of the chain stop member 106 in the manner shown in FIG. 12. Then, the grinding wheel 20 is swung down into position as shown in FIG. 5. Simultaneously, the chain hold down member 42 swings down against the chain 24 to prevent it from moving. The operator of the machine then operates the motorcycle grip 101 shown in FIGS. 7 and 10, which moves the carriage housing 49, and correspondingly moves the cutter link 56 into engagement with the grinding wheel 20. Movement of the carriage housing and the cutter link is limited by the abutment screws 100, 102 which are preadjusted.

As was previously mentioned, the construction of the carriage device 48 gives the operator a great deal of sensitivity when he moves the cutter link 56 against the grinding wheel 20. Having this sensitivity means that the cutter link will not be overly ground at any one particular time, thus increasing the number of times any particular cutter link can be sharpened. Also, proper angular adjustment of the circular chain holder 104 levels each link accurately, which further ensures against overgrinding.

Figure 14:
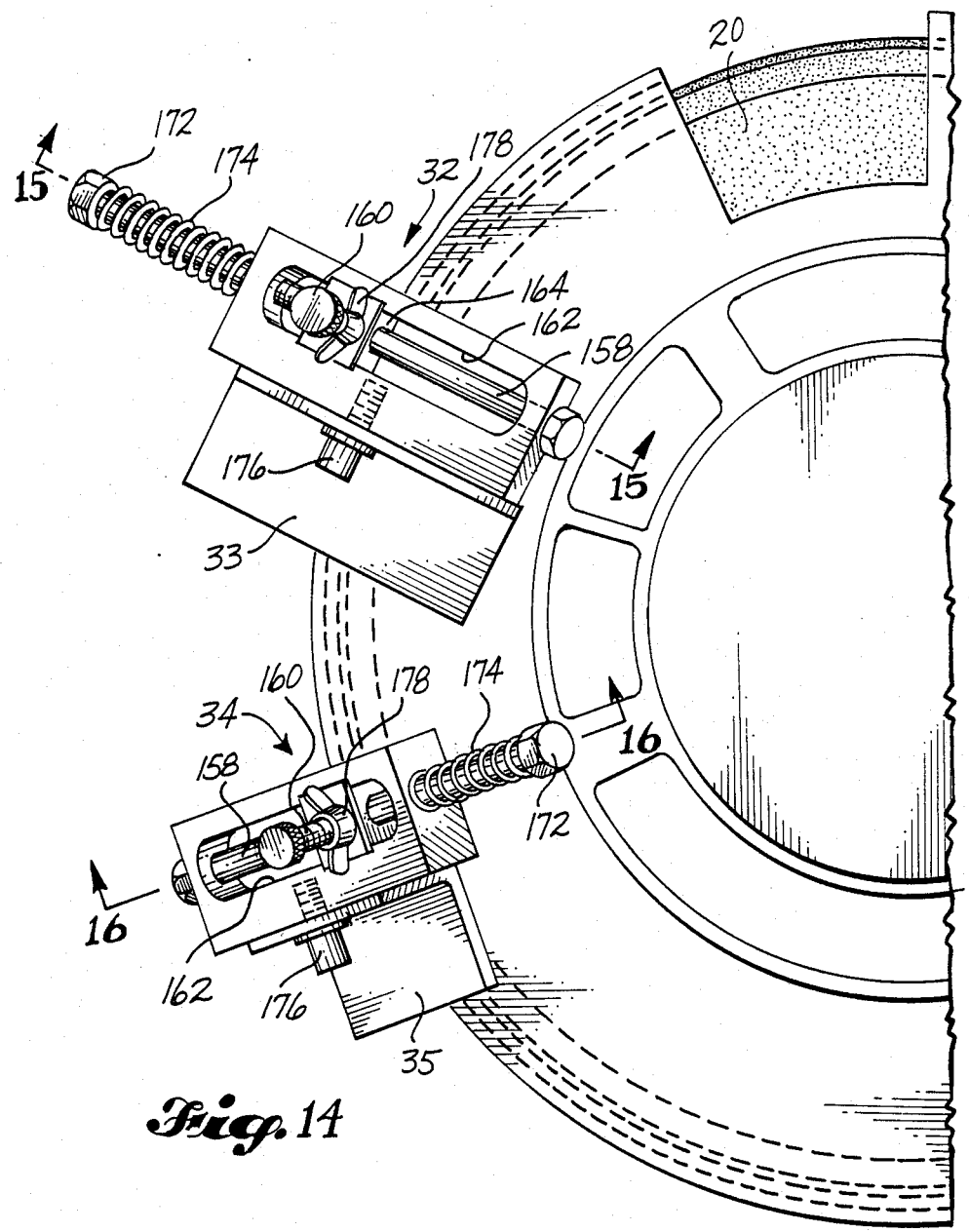
FIG. 14 is a fragmentary top plan view of the grinding wheel housing of the machine shown in FIGS. 1-3, and shows two stone dressers mounted to the housing.

The stone dressers 30, 34 are used to dress the beveled edge 58 of the grinding wheel 20. Referring to FIGS. 14-16, each stone dresser 32, 34 has a plunger 158 which is useable to reciprocate a stone dressing member 160 back and forth in a guide 162. The dressing member 160 is threadedly engaged with a block 164 that slides in the guide 162. The plunger 158 extends outwardly from both sides of the block 164 and through openings 166, 168 at each end of the guide 162. This is best seen in FIGS. 15 and 16.

The dressing member 160 has a stone dressing end 170 that moves across one of the grinding wheel beveled edge surfaces 60, 64 as the plunger 158 is moved inwardly by pushing on a knob 172 on the end of the plunger. This in turn dresses an edge surface of the bevel. A spring 174 returns the plunger 158 to its original position.

A separate stone dresser 32, 34 is provided for each separate beveled edge surface 60, 64 of the grinding wheel 20. By way of example, the dresser 32 shown in FIGS. 1-3, 4 and 14 dresses the beveled edge surface 64. Similarly, the other stone dresser 34 dresses the other beveled edge surface 60.

Angular adjustment of each dressing member's dressing end 170 may be accomplished by loosening and tightening a thumb wheel screw 176 which connects each dresser 32, 34 to its respective mounting bracket 33, 35 (see FIGS. 2 and 14). The dressing end 170 of each dresser 32, 34 can also be extended or retracted by screwing each dressing member 160 inwardly or outwardly through the block 164. A wing nut 178 is provided for locking the dressing member 160 in position. The stone dressers 32, 34 keep the edge 58 of the grinding wheel 20 even during sharpening, thus prolonging the life of the wheel.

The above description is provided for setting forth a best mode for carrying out the invention. This description is not meant to limit the invention or the scope of patent protection for the invention in any way or manner. It is conceivable, for example, that many forms of saw chain grinding machines could be built which practice the invention. The invention, therefore, is to be limited only by the subjoined claims in accordance with the doctrines of patent claim interpretation.

What is claimed is:

1. A carriage device for use in connection with a saw chain grinding machine, for moving a cutter link of a saw chain into engagement with a rotating grinding wheel that is mounted to said machine, said carriage device comprising:
   a base mounted to said machine and having a pair of spaced supports;
   a guide bar supported at each end by said supports and spanning the distance between said supports;
   a housing having means, mounted to said housing, for holding a cutter link of said chain;
   roller means for interconnecting said housing and said guide bar in a manner so that said housing may freely roll along the length of said guide bar;
   a spring interconnecting said housing and said guide bar, said spring being biased to pull said housing and said cutter link away from said grinding wheel; and
   means operable to pull said housing against the bias of said spring, so that said cutter link may be moved into engagement with said grinding wheel.

2. The device of claim 1, wherein said carriage housing is hollow, and said guide bar comprises a rectangular bar, with said bar being received within said housing in a manner so that said housing surrounds said bar, and with said bar normally projecting outwardly through opposite end openings of said housing, and including a pair of expandable bellows, wherein one each of said bellows has a first end covering one of said housing end openings, and a second end attached to said guide bar, in a manner so that said bellows seal the inside of said housing against dirt intrusion as said housing moves along said bar.

3. The device of claim 1, wherein said roller means comprises a plurality of rollers mounted inside said carriage housing, and wherein some of said rollers are oriented for rolling contact on a horizontal side surface of said rectangular guide bar, and wherein some of said rollers are oriented for rolling contact with a vertical side surface of said rectangular guide bar, and wherein said rollers operatively cooperate with each other so that said carriage housing is supported by said guide bar and is movable along the length thereof.

4. the device of claim 1, wherein said chain holding means is adjustable about a horizontal axis for altering the angular position of said cutter link relative to said grinding wheel.

5. In a chain saw sharpening machine in which a cutter link to be sharpened is mounted onto a carriage device, and the carriage device is moved relative to a rotating grinding wheel to bring the cutter link into grinding engagement with the wheel, an improved support for holding said cutter link, comprising:
   a chain holder having a circular track for guiding said saw chain, said holder further having a chain stop member with a link-catching portion, said chain stop member being positioned adjacent said track so that said link-catching portion may engage with a cutter link as said chain is guided by said track, for holding said cutter link in a particular position, and wherein the position of said chain stop member is angularly adjustable about a generally horizontal axis, to level said cutter link prior to engagement of said link with said grinding wheel.

6. The device of claim 5, wherein said chain stop member is pivotably connected to said chain holder, so that said link-catching portion may pivot to permit a cutter link to pass said chain stop member in a particular direction without engaging with said chain stop member.

7. For use in connection with a saw chain grinding machine, wherein a rotating grinding wheel is used to sharpen a cutter link of a saw chain, a stone dressing device comprising:
   a guide member, connected to said grinding machine, near said grinding wheel;
   an elongated plunger member slidably connected to said guide member, said plunger member being movable back and forth in a certain direction between two positions;
   a stone dressing member connected to said plunger member, said stone dressing member having a stone dressing end portion projecting outwardly from said guide member and generally toward said wheel, wherein said stone dressing member moves correspondingly with movement of said plunger member so that said end portion dresses an edge surface of said grinding wheel during such movement; and
   a spring interconnecting said plunger member and said guide member, said spring being biased to moved said plunger member into one of said two positions.

8. The device of claim 7, including
   means for adjusting the distance said stone dressing end portion projects outwardly from said guide portion.

9. The device of claim 7, including
   means for adjusting the angular position of said guide member relative to said grinding wheel.

* * * * *